(12) United States Patent
Nurminen

(10) Patent No.: US 9,904,929 B2
(45) Date of Patent: Feb. 27, 2018

(54) DETERMINING THE EFFECTS OF ADVERTISING

(75) Inventor: Jukka K. Nurminen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 2224 days.

(21) Appl. No.: 11/746,132

(22) Filed: May 9, 2007

(65) Prior Publication Data
US 2008/0281668 A1    Nov. 13, 2008

(51) Int. Cl.
*G06Q 10/00* (2012.01)
*G06Q 30/00* (2012.01)
*G06Q 30/02* (2012.01)
*G06Q 30/06* (2012.01)

(52) U.S. Cl.
CPC ......... *G06Q 30/02* (2013.01); *G06Q 30/0246* (2013.01); *G06Q 30/0601* (2013.01)

(58) Field of Classification Search
CPC .......................................... G06Q 10/00–50/00
USPC ...... 705/10, 26, 7.29, 14.4, 14.41, 7.11–7.42
See application file for complete search history.

(56) References Cited

U.S. PATENT DOCUMENTS

| | | | |
|---|---|---|---|
| 5,933,811 A * | 8/1999 | Angles et al. ............. | 705/14.56 |
| 6,484,148 B1 * | 11/2002 | Boyd ..................... | G06Q 30/02 340/8.1 |
| 6,539,400 B1 * | 3/2003 | Bloomfield et al. | |
| 6,976,000 B1 | 12/2005 | Manganaris et al. | |
| 7,092,964 B1 | 8/2006 | Dougherty et al. | |
| 7,119,716 B2 * | 10/2006 | Horstemeyer ................ | 340/994 |
| 7,188,177 B2 * | 3/2007 | Taylor .......................... | 709/227 |
| 2002/0013725 A1 * | 1/2002 | Takakura et al. ............... | 705/10 |
| 2002/0102993 A1 * | 8/2002 | Hendrey ................ | G06Q 10/00 455/456.3 |
| 2002/0107027 A1 * | 8/2002 | O'Neil ................... | G06Q 30/02 455/456.3 |
| 2002/0147642 A1 * | 10/2002 | Avallone ................ | G06Q 10/02 705/14.25 |
| 2003/0083937 A1 * | 5/2003 | Hasegawa et al. ............. | 705/14 |
| 2003/0126146 A1 * | 7/2003 | Van Der Riet ............... | 707/100 |

(Continued)

OTHER PUBLICATIONS

Measuring the effects and effectiveness of interactive advertising: A Research Agenda—By Pavlou et al. Journal of interactive advertising, vol. 1 No. 1 (Fall 2000), pp. 62-78.*

(Continued)

*Primary Examiner* — Alan S Miller
(74) *Attorney, Agent, or Firm* — Ditthavong & Steiner, P.C.

(57) ABSTRACT

Apparatuses, methods, and computer program products for determining the effect of advertising are provided. Advertisement data is gathered at the location of an advertisement regarding the identity of the consumer exposed to the advertisement (the target), as well as the subject matter of the advertisement, by detecting the proximity of the target to the advertisement location, for example by using the target's mobile terminal. Shopping data is gathered at the location of a commercial establishment regarding the identity of the consumer engaged in the shopping activity (the shopper), as well as the subject matter of the shopping activity, by detecting the proximity of the shopper to the commercial establishment location, for example by using the shopper's mobile terminal. The data is received by a correlation server and analyzed to determine the effect of advertisements on a consumer.

17 Claims, 8 Drawing Sheets

(56) References Cited

U.S. PATENT DOCUMENTS

| | | | |
|---|---|---|---|
| 2003/0171988 A1* | 9/2003 | Sugihara | 705/14 |
| 2003/0220835 A1* | 11/2003 | Barnes, Jr. | 705/14 |
| 2004/0172324 A1* | 9/2004 | Merriman et al. | 705/10 |
| 2004/0199398 A1* | 10/2004 | Kubota | 705/1 |
| 2004/0254837 A1* | 12/2004 | Roshkoff | 705/14 |
| 2006/0089876 A1* | 4/2006 | Boys | 705/14 |
| 2007/0073585 A1* | 3/2007 | Apple | G06Q 30/02 705/14.46 |
| 2007/0073586 A1* | 3/2007 | Dev et al. | 705/14 |
| 2007/0135993 A1* | 6/2007 | Riise et al. | 701/207 |
| 2007/0185768 A1* | 8/2007 | Vengroff et al. | 705/14 |
| 2008/0052276 A1 | 2/2008 | Tzamaloukas et al. | |
| 2008/0059294 A1* | 3/2008 | Schauser | G06Q 10/06 705/14.49 |
| 2008/0059424 A1 | 3/2008 | Tzamaloukas et al. | |
| 2008/0077559 A1 | 3/2008 | Currie et al. | |
| 2008/0133342 A1* | 6/2008 | Criou | G06Q 30/02 705/14.41 |
| 2008/0172781 A1* | 7/2008 | Popowich | G06Q 30/02 4/476 |
| 2008/0248815 A1* | 10/2008 | Busch | H04W 4/02 455/456.5 |
| 2008/0281668 A1* | 11/2008 | Nurminen | 705/10 |

OTHER PUBLICATIONS

Service Discovery in DEAPspace—By Michael Nidd, IBM Research, Zurich IEEE Personal Communications—Aug. 2001.*

Chuang, Shin Wee, and Tanasak Krabuanrat. "Location-Based Advertising." speaks . . . : 10.*

Office Action for related U.S. Appl. No. 11/757,602 dated Oct. 7, 2011, pp. 1-43.

1 Final Rejection for related U.S. Appl. No. 11/757,602 dated Apr. 16, 2012, pp. 1-42.

Office Action for related U.S. Appl. No. 11/757,602 dated Oct. 12, 2012, pp. 1-44.

* cited by examiner

DETERMINING THE EFFECTS OF ADVERTISING

TECHNOLOGICAL FIELD

Embodiments of the present invention relate generally to communications technology and, more particularly, to determining the effects of advertising on users of computing devices using advertising and shopping data transmitted over a communications network.

BACKGROUND

It is often important for advertisers to gather marketing information to assess the effectiveness of advertisements and promotions. Advertisements that may seem clever and attractive at a marketing meeting may not be successful in gaining the interest of consumers in the real world. Consumers may not understand the advertisement, they may be offended, or they may not relate to the message conveyed.

Advertisers have tried to improve the communication of goods and services to consumers by conducting surveys of random consumers in various ways. Individuals may approach consumers in public places, such as malls and sidewalks, to ask a series of questions related to a particular good or service. Similarly, written questionnaires may be mailed to a random selection of consumers in the hopes of eliciting valuable marketing information.

Although such efforts have sometimes yielded some indications as to how consumers think, not all consumers approached in this manner are enthusiastic to cooperate. Some may refuse to participate all together and may simply ignore the survey. Others may not give truthful answers to the survey questions, either as a disguised protest to being questioned or in an effort to provide answers that fit in with a preconceived "normal" response. Even if the consumer is a willing and honest participant, the consumer may not accurately recall his or her consumer-related actions and choices. Thus, in addition to the cost of manually gathering a statistically relevant number of responses, information gathered in this way may not provide a true picture of the consumers' practices and state of mind. Furthermore, the compilation of such responses and the transformation of the responses into meaningful market data may require a large amount of time, money and effort.

Therefore, there is a need for gathering more accurate information about the behavior of consumers with respect to the advertisements to which they are exposed and the shopping activities in which they engage and for analyzing the information to obtain indicators of the effectiveness of advertising efforts.

BRIEF SUMMARY

Methods, apparatuses, and computer program products are therefore provided for determining the effect of advertising. Advertisement data permitting the identification of consumers exposed to advertisements and shopping data permitting the identification of consumers shopping for goods and services may be gathered and correlated to determine whether the same consumers who experienced an advertisement were engaged in shopping activities relating to the subject matter of the advertisement.

In one exemplary embodiment, a method and computer program product for determining the effect of advertising is provided. The method and computer program product include receiving advertisement data including information identifying one or more targets that were proximate a location of at least one advertisement and receiving shopping data including information identifying one or more shoppers that were proximate a location of a commercial establishment. The advertisement data and the shopping data are then analyzed to determine whether any target associated with an advertisement is also a shopper associated with the commercial establishment relating to the respective advertisement.

The advertisement data may be received by communicating with a mobile terminal associated with the target to obtain the advertisement data. The advertisement data may also be received by communicating with a device at the location of the advertisement(s). Similarly, the shopping data may be received by communicating with a mobile terminal associated with the shopper to obtain the shopping data. The shopping data may also be received by communicating with a device at the location of the commercial establishment. In some embodiments, signals associated with the target may be received and the proximity of the target to the location of the advertisement(s) may be determined based on the signals. Likewise, signals associated with the shopper may be received and the proximity of the shopper to the location of the commercial establishment may be determined based on the signals. Furthermore, a number of instances of advertisement and shopping data may be received over a predetermined period of time and stored.

In other exemplary embodiments, an apparatus and computer program product for gathering advertisement information are provided. The apparatus includes an advertising receiver configured to receive at least one advertisement for display to a target and a transmitter configured to transmit an advertisement identifier. The advertisement identifier permits an identification of subject matter of the at least one advertisement to permit correlation with shopping data identifying at least one subsequent shopping activity by the target relating to the subject matter of the at least one advertisement. The transmitter may be configured to transmit the advertisement identifier to a mobile terminal associated with the target.

The apparatus may also include an ID receiver configured to receive a consumer identifier from a mobile terminal associated with the target that permits identification of the target. The transmitter may be configured to transmit the consumer identifier and the advertisement identifier to a correlation server, for example for storage and/or analysis. The apparatus may also include a display configured to present the advertisement(s) to the target. The display may be a computer monitor, a television, a mobile terminal screen, a display screen, a billboard, or other device. In addition, the advertising receiver may include means for receiving the advertisement(s) for display to the user of the mobile terminal, and the transmitter may include means for transmitting the advertisement identifier to the mobile terminal.

In another exemplary embodiment, an apparatus and computer program product for providing information related to advertisement and shopping data are provided. The apparatus includes a controller and a transmitter responsive to the controller configured to transmit a consumer identifier that permits identification of a consumer and is indicative of a proximity of the consumer to a location of an advertisement or a location of a commercial establishment. The consumer identifier may be directed to a correlation server and may be subsequently analyzed to determine whether any consumer proximate the location of the advertisement was also proximate the location of a commercial establishment relating to the respective advertisement. The transmitter may be configured to transmit the consumer identifier to a receiver at the location of the advertisement or at the location of the commercial establishment.

The apparatus may also include a receiver configured to receive an advertisement identifier proximate the location of the advertisement that permits identification of a subject matter of the advertisement, and the transmitter may be configured to transmit the consumer identifier and the advertisement identifier to the correlation server. The receiver may also be configured to receive a shopping identifier proximate the location of the commercial establishment that permits identification of a subject matter of the shopping activity. Furthermore, the controller may include means for controlling the transmitter, and the transmitter may include means for transmitting the consumer identifier.

In another exemplary embodiment, an apparatus for determining the effect of advertising is provided. The apparatus includes a processor configured to receive advertisement data including information identifying at least one target that was proximate a location of one or more advertisements, to receive shopping data including information identifying at least one shopper that was proximate the location of a commercial establishment, and to analyze the advertisement data and the shopping data to determine whether any target associated with an advertisement is also a shopper associated with the commercial establishment relating to the respective advertisement.

The processor may be configured to repeatedly receive the advertisement data from a mobile terminal associated with the target and to repeatedly receive the shopping data from a mobile terminal associated with the shopper. Alternatively, the processor may be configured to receive the advertisement data from a mobile terminal associated with the target when the target is proximate the location of the advertisement and/or may be configured to receive the shopping data from a mobile terminal when the shopper is proximate the location of the commercial establishment. The processor may also be configured to receive the advertisement data and the shopping data from the mobile terminal when the shopping data relates to a subject matter of the advertisement data.

The apparatus may also include a storage area configured to store multiple instances of advertisement data and shopping data for a number of targets and shoppers, and the storage area may be accessible by the processor. Furthermore, the processor may include means for receiving the advertisement data including information identifying the at least one target that was proximate the location of the advertisement(s), means for receiving the shopping data including information identifying the at least one shopper that was proximate the location of the commercial establishment, as well as means for analyzing the advertisement data and the shopping data to determine whether any target associated with an advertisement is also a shopper associated with the commercial establishment relating to the respective advertisement.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
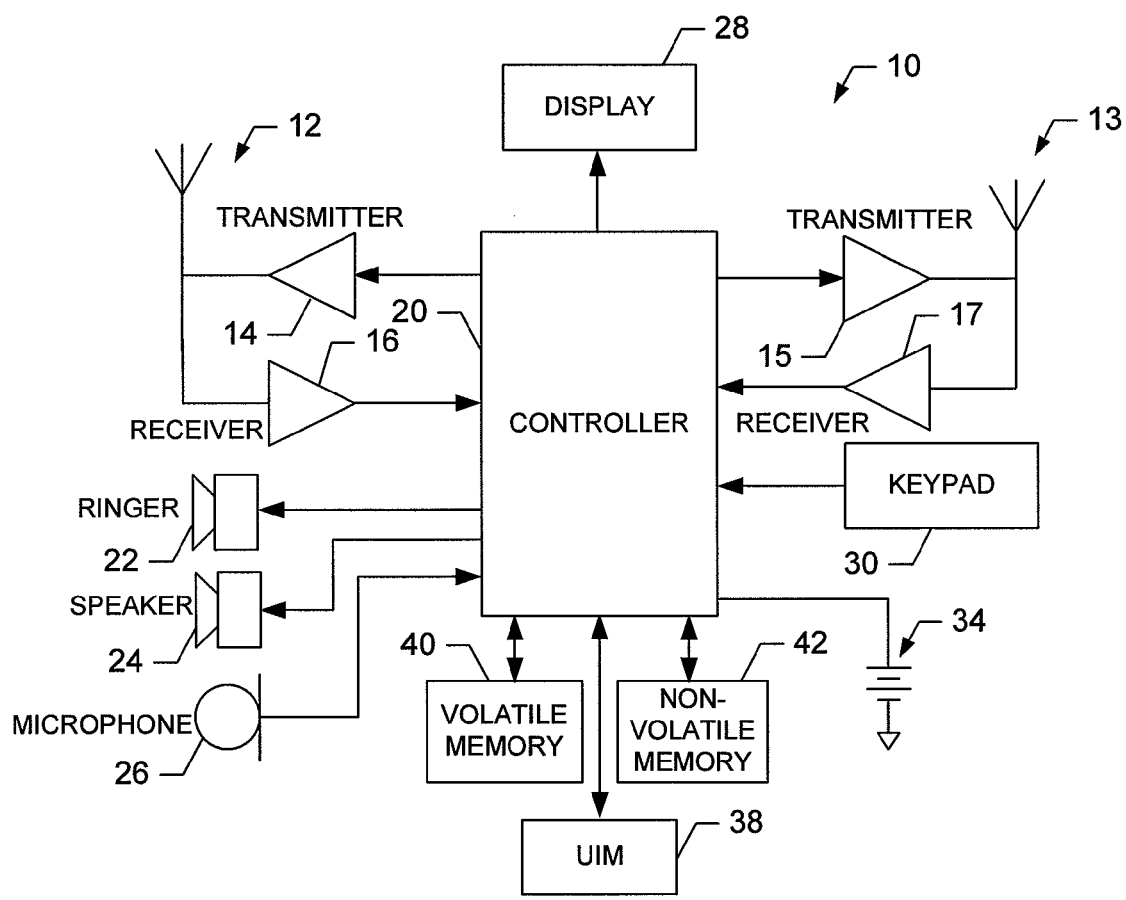
FIG. 1 is a schematic block diagram of a mobile terminal according to an exemplary embodiment of the present invention.

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, personal computers or other computer workstations, or indeed, any electronic device involving hardware and software elements via which a user establishes network communications would similarly benefit from the present invention. Accordingly, the present invention should not be construed as being limited to applications in the mobile communications industry.

The mobile terminal 10 includes an antenna 12 in operable communication with a transmitter 14 and a receiver 16. The mobile terminal 10 further includes means for controlling the transmitter 14, the receiver 16, and other components of the mobile terminal 10. For example, such means may include a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

The mobile terminal 10 may also have a separate antenna 13 in operable communication with another transmitter 15 and receiver 17 and controlled by means such as the controller 20 or other processing element. The other transmitter 15 and receiver 17 may be designated, for example, for transmitting and receiving proximity signals, such as via RF, BT, IrDA, or other communication techniques, as described below. Furthermore, any of the transmitters 14, 15 and receivers 16, 17 may be configured to send and receive signals for determining a location of the mobile terminal 10. For example, signals may be exchanged with satellites orbiting the earth to allow the location of the mobile terminal 10 to be determined using the Global Positioning System (GPS), WLAN triangularization, or other locating techniques.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
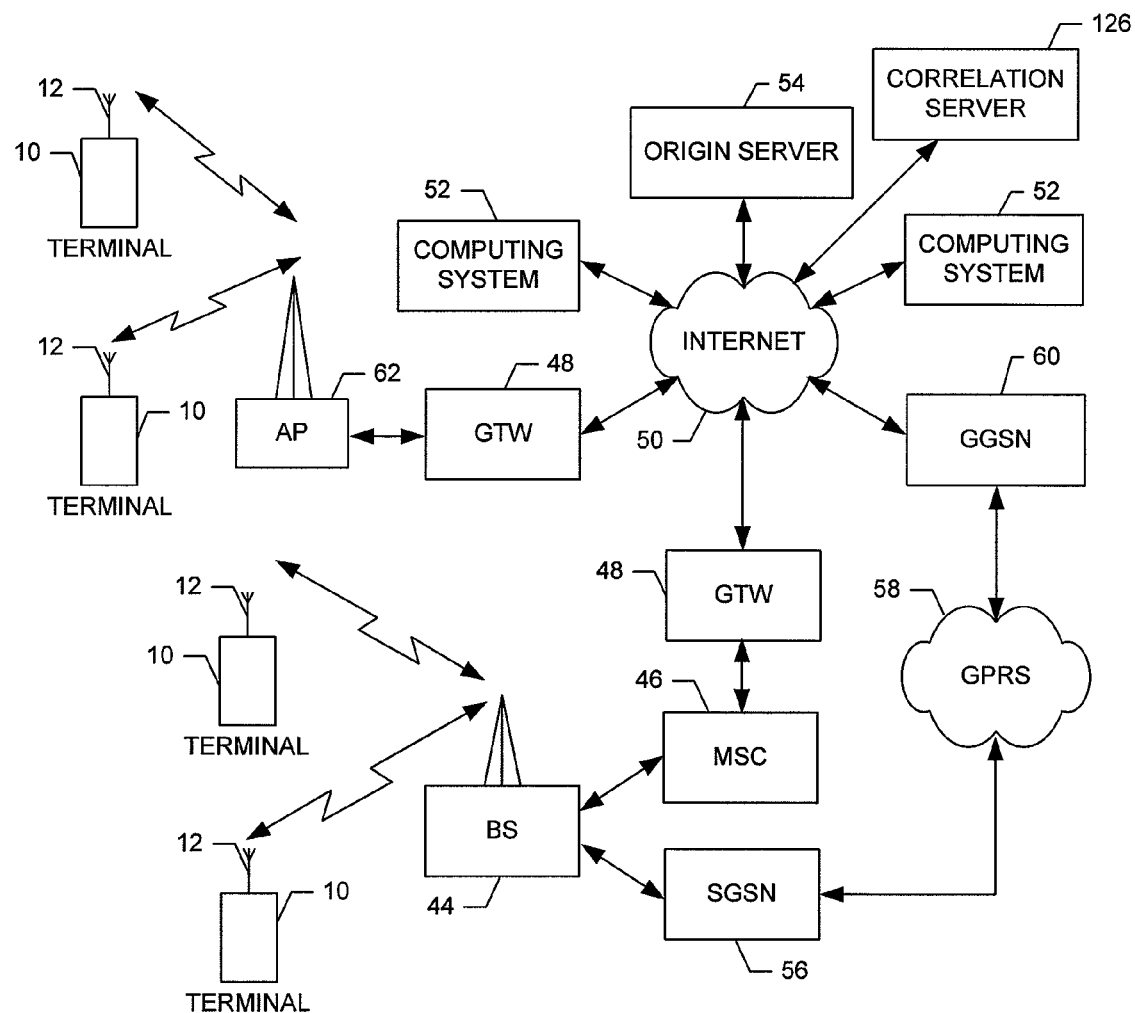
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices, any of which may employ embodiments of the present invention. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52, origin server 54, and/or correlation server 126 may be coupled to the mobile terminal 10 via the Internet 50, SGSN 56 and GGSN 60. In this regard, devices such as the computing system 52, origin server 54 and/or correlation server 126 may communicate with the mobile terminal 10 across the SGSN 56, GPRS core network 58 and the GGSN 60. By directly or indirectly connecting mobile terminals 10 and the other devices (e.g., computing system 52, origin server 54, correlation server 126, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, the correlation server 126, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. For example, the mobile terminal 10 may receive advertising content from the computing system 52, such as in the form of web advertisements. As used herein, the terms "data," "content," "information," "signals," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Exemplary embodiments of the invention will now be described with reference to FIGS. 3, 4, and 5, in which certain elements of a system for determining the effect of advertising are displayed. The systems of FIGS. 3, 4, and 5 may communicate, for example, via the network of FIG. 2 as will be discussed below. However, it should be noted that the systems of FIGS. 3 and 4 may also be employed in a variety of other networks, both mobile and fixed, and therefore embodiments of the present invention should not be limited to the network of FIG. 2.

According to exemplary embodiments of the invention, advertisement data 112 is gathered at the location of an advertisement 100, such as at a billboard, computer, display 102, television, or mobile terminal 10, regarding the identity of the consumer exposed to the advertisement (the target 104) as well as the subject matter of the advertisement (e.g., a restaurant, a recreational activity, a corporation, a product 106, or other propaganda message). Similarly, shopping data 114 is gathered at the location of a commercial establishment 108, such as at the restaurant, the stadium ticket counter, the store, or other commercial establishment, regarding the identity of the consumer visiting the commercial establishment (the shopper 110), as well as the subject matter of the shopping activity (e.g., what goods or services are associated with the particular commercial establishment, possibly including what service was rendered or which product was purchased). By correlating the advertisement data 112 with the shopping data 114, the effect of advertisements on a consumer may be determined.

Figure 3:
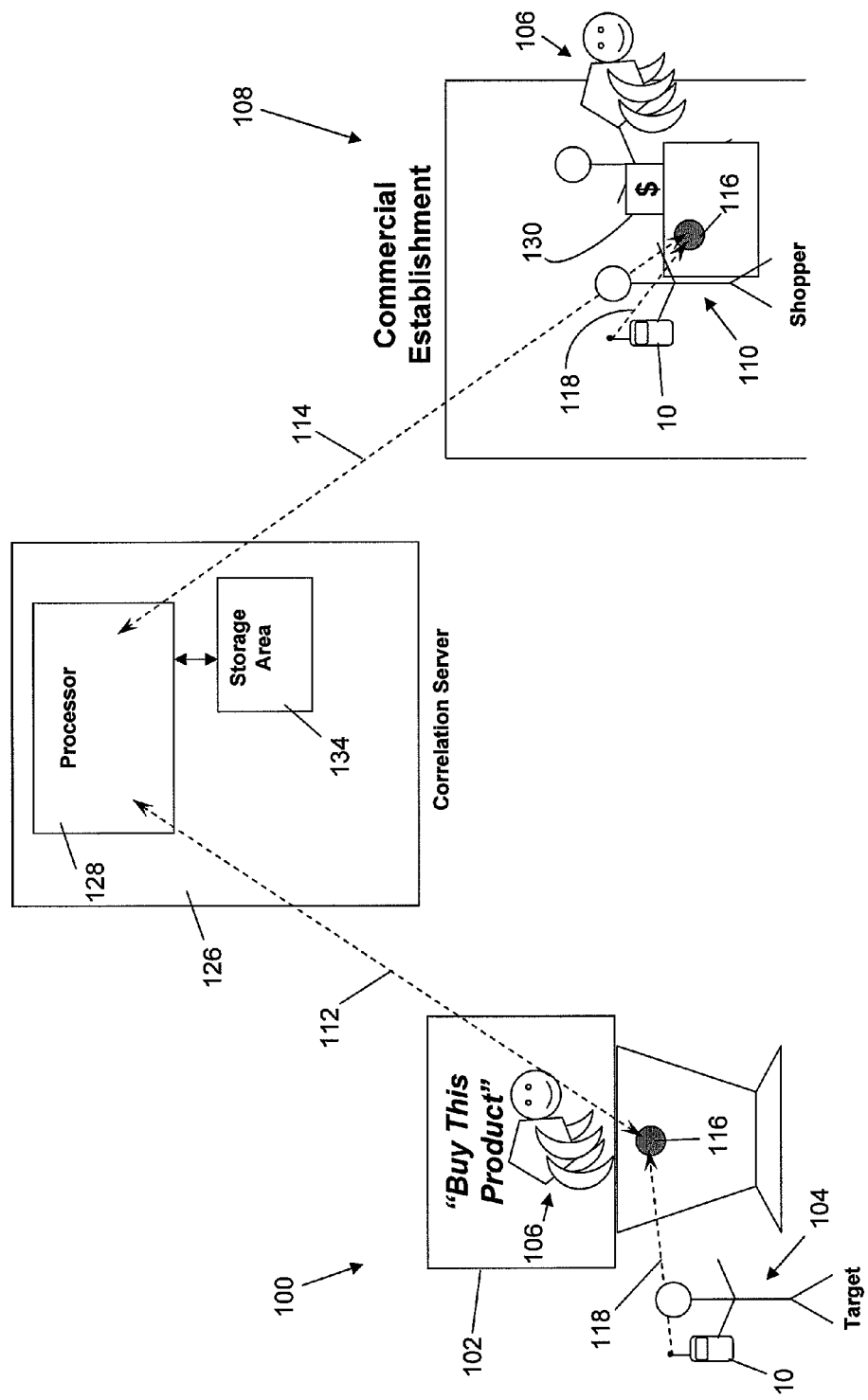
FIG. 3 is a schematic block diagram showing communication among an advertising apparatus, a correlation server, and a commercial establishment according to one embodiment of the present invention.

Referring now to FIG. 3, a system for determining the effect of advertising is provided according to one embodiment. The target 104, such as a consumer of goods and services, may be detected at a location of an advertisement 100. For example, the target 104 may be carrying a mobile terminal 10, such as a cellular phone, that includes means, such as a transmitter 15 (shown in FIG. 1), for transmitting a consumer identifier 118 (i.e., a signal that includes data identifying the consumer associated with the mobile terminal) to an ID receiver 116 at the location of the advertisement 100. For example, the ID receiver 116 may be located on the advertising apparatus 102, such as on the display as shown in FIG. 3, or in a peripheral device connected to a computer at which a target 104 is exposed to website advertisements (not shown). Alternatively, the ID receiver 116 may be located near the advertising apparatus, such as on a wall beside a display screen or on a nearby piece of equipment.

In any case, the ID receiver 116 may be configured to receive the consumer identifier 118 from the mobile terminal 10 associated with the target 104, for example via the network of FIG. 2. The consumer identifier 118 may be indicative of a proximity of the consumer (i.e., the target 104) to the location of the advertisement 100. For example, the transmitter 14 of the mobile terminal 10 (shown in FIG. 1) may be a near-field transmitter configured to transmit the consumer identifier 118 to an ID receiver 116 located within a certain distance from the mobile terminal 10, such as two feet. Thus, in this example, if the target 104 carrying the mobile terminal 10 comes within two feet of the ID receiver 116 (which is on or near the advertising apparatus 102 where the advertisement is being displayed), the ID receiver 116 will receive the consumer identifier 118. In this way, implicit in the receipt of the consumer identifier 118 is an indication that the target 104 was near the advertisement and was likely exposed to the advertisement's message (e.g., the target 104 saw or heard the advertisement).

The consumer identifier 118 may include one or more items of data that permit identification of the consumer (i.e., the target 104). Thus, the consumer identifier 118 may include a telephone number, MAC address, or other identifier of the mobile terminal 10 associated with the target 104; an account number; the target's name or user identification; or any other information that would directly or indirectly identify the target 104. The consumer identifier may identify the consumer, the consumer's equipment (e.g., the mobile terminal 10 used by the consumer), or both.

Figure 4:
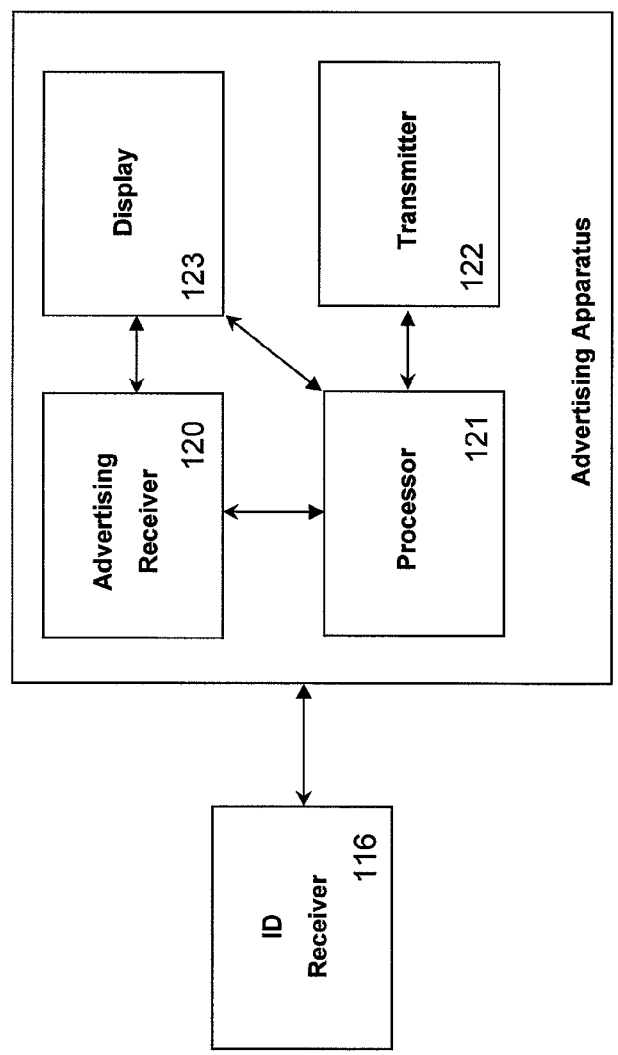
FIG. 4 is a schematic block diagram of an advertising apparatus according to an exemplary embodiment of the present invention.
Figure 5:
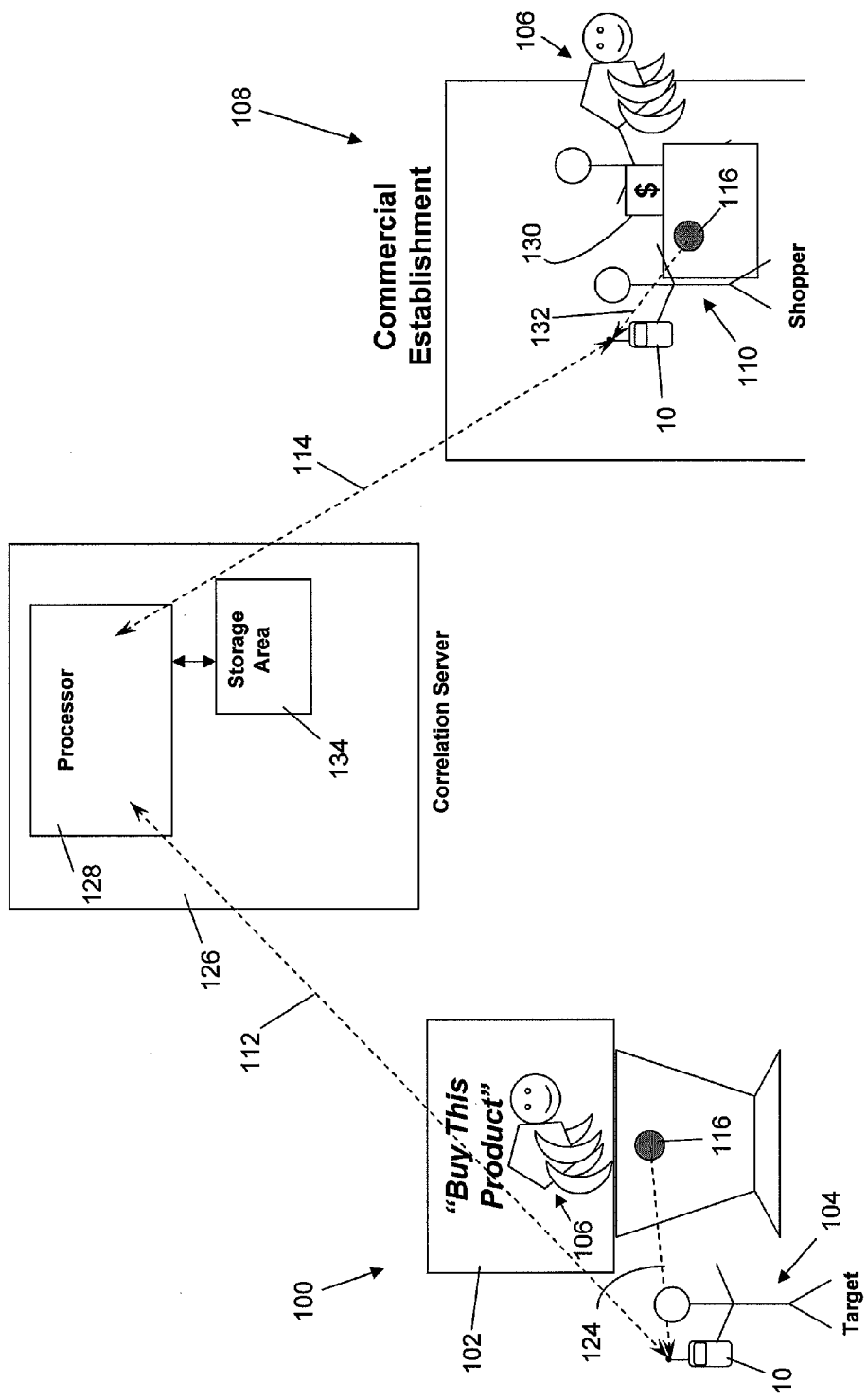
FIG. 5 is a schematic block diagram showing communication among an advertising apparatus, a correlation server, and a commercial establishment according to another embodiment of the present invention.

Referring to FIG. 4, the advertising apparatus 102, such as the mobile terminal, the computer, or the display, may include means, such as an advertising receiver 120, for receiving one or more advertisements and means, such as a transmitter 122, for transmitting an advertisement identifier 124 (shown in FIG. 5). The advertising apparatus 102 may also include a display 123 configured to present the advertisement(s), such as a computer monitor, a television, a mobile terminal screen, a display screen, or a billboard. A processor 121 configured to communicate with and control the functions of the various elements of the advertising apparatus 102 may also be included.

The advertising receiver 120 may be an analog or digital receiver, such as for receiving radio signals or information via the Internet, a cellular network or other Wide Area Network. Thus, the advertisement received may be in the form of a radio announcement, an image, a website, a voice or text message, or a video advertisement, among other forms. The transmitter 122 may be configured to transmit the advertisement identifier 124 over a Wide Area Network to a receiver, as discussed below.

The advertisement identifier 124 may include one or more items of data that permit an identification of the subject matter of the advertisement(s) displayed at the advertising apparatus 102, directly or indirectly. For example, the advertisement identifier 124 may include a code corresponding to the particular advertisement shown (such as a particular advertisement for a certain restaurant) or an identifier for the subject matter in general (such as the name of the restaurant or product advertised). Alternatively, the information may include the date and time the advertisement was displayed to the target 104 and the particular advertising apparatus through which it was displayed (e.g., an identification of the advertising location 100 or the particular display screen 102 used), which may allow the advertisement to be identified indirectly (for example, by using an index of advertising locations and the advertisement that was displayed at that time).

Turning again to FIG. 3, upon receiving the consumer identifier 118 from the target's mobile terminal 10, the advertising apparatus 102 may transmit the consumer identifier 118 and the advertisement identifier to a correlation server 126, for example via the network of FIG. 2. The correlation server 126 may be any computing device, such as a computer or system of computers, and may include means for receiving and analyzing data, such as a processor 128. The processor 128 may be configured to receive advertisement data 112 including information identifying one or more targets 104 that were proximate the location of the advertisement 100. For example, the advertisement data 112 may include the consumer identifier 118 and the advertisement identifier 124, which may have been bundled and sent as a single transmission by the advertising apparatus 102, as described above.

After the target 104 has left the location of the advertisement 100 (i.e., after the target has seen the advertisement and has left the vicinity), the target 104 may become a shopper 110 of the good or service advertised (or of a different good or service). For example, after seeing an advertisement on a display screen 102 for a product 106, such as a fictional toy creature with banana-like appendages, the target 104 may consider purchasing the product 106 for his next-door neighbor's daughter. The target 104 may go into a commercial establishment 108 that specializes in the sale of fictional toy creatures to further investigate the product 106. At this point, the consumer may be considered a shopper 110. The shopper 110, who is still carrying his mobile terminal 10 may thus be proximate the location of the commercial establishment relating to the advertisement to which he was previously exposed (i.e., he is now visiting the store that sells the product 106 he saw advertised).

At the location of the commercial establishment 108, the mobile terminal 10 associated with the shopper 110 may transmit the same consumer identifier 118 to an ID receiver 116 at the location of the establishment 108. This may occur in various ways. For example, a near-field transmitter of the mobile terminal 10 may communicate with a near-field receiver near the location of the commercial establishment 108, such as at an entrance of the store or on or near the cash register 130 or other point-of-sale (POS) device. In addition to more conventional POS devices, a computer used by the consumer to make a purchase, such as a personal computer used by the consumer to investigate or buy a good or service from home via the Internet, may communicate with the mobile terminal 10 to receive the consumer identifier 118. In this regard, a commercial establishment 108 may include a virtual commercial establishment, such as a website, in addition to a physical location such as a store.

Alternatively, if the consumer decides to make a purchase, the mobile terminal 10 may be used in the transaction itself, such as to transfer ftmds from a bank account, similar to the way a credit or debit card is used. In this case, the consumer identifier 118 may be included or embedded in the data transmitted to the commercial establishment 108 as part of the transaction itself (rather than as a result of the proximity of the shopper 110 to the physical location of the ID receiver 116). The consumer identifier need not be provided by the mobile terminal and may be provided in other manners. For example, the consumer identifier 118 may be intrinsic to the commercial transaction itself. In other words, a credit or debit card used to purchase the product 106 may identify an account number or the shopper's name, and this information may be used as the consumer identifier 118 for the purposes of the commercial transaction. In another example, a consumer loyalty card, such as a store-specific discount card may provide the information during the course of the transaction. As such, the consumer identifier 118 at the location of the advertisement 100 may have a different form than the consumer identifier 118 at the location of the commercial establishment 108, although both may identify the target 104 or the shopper 110, respectively, directly or indirectly.

Regardless of the form of the consumer identifier 118 or the way it is received at the location of the commercial establishment 108, the processor 128 of the correlation server 126 is configured to receive shopping data 114 that identifies the shopper 110 associated with (e.g., visiting) the commercial establishment, for example via the network of FIG. 2. For example, a computer, POS device, or other device may be configured to transmit the shopping data 114 during the course of the shopping activity or commercial transaction. The shopping data 114 may include information such as the consumer identifier 118 and a shopping identifier 132, which may identify the subject matter of the shopping activity. The shopping identifier 132 may include various information describing the subject matter of the shopping activity, such as information identifying the commercial establishment 108 (e.g., a store locator), the date and time of the visit, the date and time of the purchase, and the good or service that was involved (e.g., the bar code of the product 106 purchased or a code describing the transaction). In this way, the correlation server 126 may analyze the advertisement data 112 and the shopping data 114 associated with various targets 104 and shoppers 110 to determine whether any target 104 associated with an advertisement is also a shopper 110 associated with a commercial establishment relating to the respective advertisement, as will be described below.

FIG. 5 illustrates another embodiment of the present invention, in which the advertisement identifier 124 and/or the shopping identifier 132 are received by a mobile terminal 10 associated with the consumer at the respective locations 100, 108 and are then relayed to the correlation server 126. In particular, the mobile terminal 10 may include a receiver 17, shown in FIG. 1, configured to receive an advertisement identifier 124 proximate the location of the advertisement 100 that permits identification of the subject matter of the advertisement, as previously discussed. Thus, at the location of the advertisement 100, the transmitter 122 of the advertising apparatus 102 may be configured to transmit the advertisement identifier 124 to the receiver 17 of the mobile terminal 10. For example, the transmitter 122 may be continuously or continually transmitting a near-field signal including the advertisement identifier 124 such that when the target 104 (carrying the mobile terminal 10) comes within range of the transmitter 122, the receiver 17 may receive the advertisement identifier 124. The controller 20 of the mobile terminal 10 (shown in FIG. 1) may then combine the advertisement identifier 124 with the consumer identifier 118 (shown in FIG. 3) to transmit the advertisement data 112 to the correlation server 126, as illustrated in FIG. 5.

Similarly, at the location of the commercial establishment 108, the receiver 17 of the mobile terminal 10 may be configured to receive the shopping identifier 132, such as from a transmitter (shown in FIG. 5 as co-located with the ID receiver 116) near the cash register 130, POS device, or other device, that permits identification of the subject matter of the shopping activity, as previously discussed. The controller 20 of the mobile terminal 10 may then include the shopping identifier 132 with the consumer identifier 118 in a transmission of shopping data 114 to the correlation server 126.

In either embodiment (FIG. 3 or FIG. 5), the proximity of the consumer (target 104 or shopper 110) to the location of the advertisement 100 or the commercial establishment 108 may be determined using GPS, WLAN triangularization, or other locating techniques. For example, GPS transmitters and receivers associated with the target 104 (such as the transmitter 15 and receiver 17 of the mobile terminal 10 associated with the target 104, shown in FIG. 1) may communicate with satellites orbiting the earth to determine a position of the target 104. The location of the target 104 may then be compared, for example by the mobile terminal 10 or by the correlation server 126, to the location of the advertisement 100 to determine whether the target 104 is proximate the location of the advertisement 100. In this way, the proximity of the target 104 or the shopper 110 to the location of the advertisement 100 or the commercial establishment 108, respectively, through the receipt of signals associated with the target 104 and/or the shopper 110 (for example by the correlation server 126) and the application of a locating technique, as described above.

The correlation server 126 may thus receive advertisement data 112, which includes information identifying a target 104 that was proximate a location of the advertisement 100, and shopping data 114, which includes information identifying a shopper 110 that was proximate the location of a commercial establishment. Through analysis of the advertisement data 112 and the shopping data 114 by the correlation server 126 to determine whether any target 104 associated with an advertisement is also a shopper 110 at a commercial establishment relating to the respective advertisement, an indication of the effectiveness of the advertisement may be gained. In some cases, the correlation server 126 may only attempt to correlate data that is gathered within a certain time frame. For example, the correlation server 126 may consider shopping data 114 received within a week of the advertisement data 112 to be relevant and may analyze such data. On the other hand, in some cases the correlation server 126 may consider shopping data 114 received six months after the advertisement data 112 was received to be too far removed from the consumer's exposure to the advertisement and, thus, irrelevant.

Various indications of the effectiveness of advertisements may be determined based on the analysis of different aspects of the advertisement data 112 and the shopping data 114. For example, the number of consumers who are both targets and shoppers for a given good or service may be considered. For instance, if 85% of consumers exposed to advertisements for a particular product (such as the fictional toy creature 106) subsequently purchased the product, the advertisements may be considered rather effective. Similarly, if only 15% of consumers exposed to an advertisement for another product subsequently purchased the corresponding product, that advertisement may be considered not very effective, or at least less effective than the advertisement for the fictional toy creature 106.

Other marketing data may also be gathered based on an analysis of the advertisement data 112 and the shopping data 114. For example, by looking at the dates/times the consumers were exposed to certain advertisements as compared to the dates on which those same consumers purchased the good or service, an average duration of advertisement effectiveness (or an advertisement "shelf-life") may be derived. For instance, an advertisement for eating at a certain restaurant may have a calculated shelf-life of three days, indicating that most people who see the advertisement and end up eating at that particular restaurant do so within three days of seeing the advertisement. As another example, an advertisement for a car (which involves a much larger financial obligation than eating at a restaurant) may have a shelf-life of six months. Other marketing data may include the advertising locations that are most effective, the forms of advertisements that are most effective (e.g., website versus billboard), as well as which advertisements for the same good or service are most effective, given a particular good or service. Furthermore, the effect that an advertisement for one product may have on total sales at the related commercial establishment may also be determined.

The processor 128 of the correlation server 126 may be configured to repeatedly receive the advertisement data from a mobile terminal 10 associated with the target 104 and to repeatedly receive the shopping data from a mobile terminal 10 associated with the shopper 110, for example in the embodiment illustrated in FIG. 5. For example, the mobile terminal 10 may send advertisement data 112 to the correlation server 126 at predetermined time intervals, such as every two minutes. In this case, if a target 104 happens to pass by six advertising apparatuses within a span of two minutes, the mobile terminal 10 may transmit advertisement data 112 containing all six instances of data corresponding to the six advertising apparatuses in a single transmission at the predetermined time. Likewise, if the target 104 does not pass by any advertisements, the mobile terminal 10 may transmit advertisement data that includes no information on advertisements.

Alternatively, the processor 128 of the correlation server 126 may be configured to receive the advertisement data 112 from a mobile terminal 10 when the target 104 is proximate the location of the advertisement 100. Thus, only when the target 104 (carrying the mobile terminal 10) passes by the advertisement and receives the advertisement identifier 124 from the advertising apparatus 102 would the mobile terminal 10 transmit advertising data 112 to the correlation server 126. Likewise, the processor 128 of the correlation server 126 may be configured to receive the shopping data 114 from the mobile terminal 10 when the shopper 110 is proximate the location of the commercial establishment (e.g., when he enters the store, when he is standing near the ID receiver 116 at the cash register 130 or other POS device, or when he is transmitting his credit card or account information to complete the transaction). If not pushed by the mobile terminal 10 or otherwise provided through the purchasing process or other activity, the processor 128 of the correlation server may be configured to query the mobile terminal 10 for the respective data at the appropriate time. For example, if the shopper 110 is viewing or purchasing the product 106 via the Internet, the processor 128 of the correlation server 126 may communicate with the controller 20 of the mobile terminal 10 to obtain the consumer identifier 118, either through the cellular network, such as through a text message, or via the computer through which the transaction is being conducted.

In some embodiments, the correlation server 126 may include a storage area 134 configured to store multiple instances of advertisement data 112 and shopping data 114 for a number of targets 104 and shoppers 110. The storage area 134 may be accessible by the processor 128 such that the processor may analyze various instances of data to determine trends and derive marketing information regarding different goods and services and advertisements for those goods and services, as described previously. The storage area 134 may be, for example, a database that holds information included in the advertisement data 112 and the shopping data 114 that is transmitted to the correlation server 126. The processor 128 may be configured to access the storage area 134 in response to queries submitted by a user, such as a market analyst interested in specific information or analyses, or the processor 128 may be configured to access the storage area 134 and analyze the data according to a previously determined set of instructions, such as through the execution of a certain software program.

In some cases, the processor 128 of the correlation server 126 may be configured to receive the advertisement data 112 and the shopping data 114 from the mobile terminal 10 when the shopping data 114 relates to a subject matter of the advertisement data 112. In other words, the mobile terminal 10 may not transmit advertisement data 112 to the correlation server until shopping data 114 relating to the same subject matter advertised is also received by the mobile terminal 10. In this way, the mobile terminal 10 may act as a repository for advertisement and shopping data 112, 114 concerning a particular user, and only when advertisement data and shopping data relating to the same goods or services are received would the data be transmitted to the correlation server 126 for further analysis.

Figure 6:
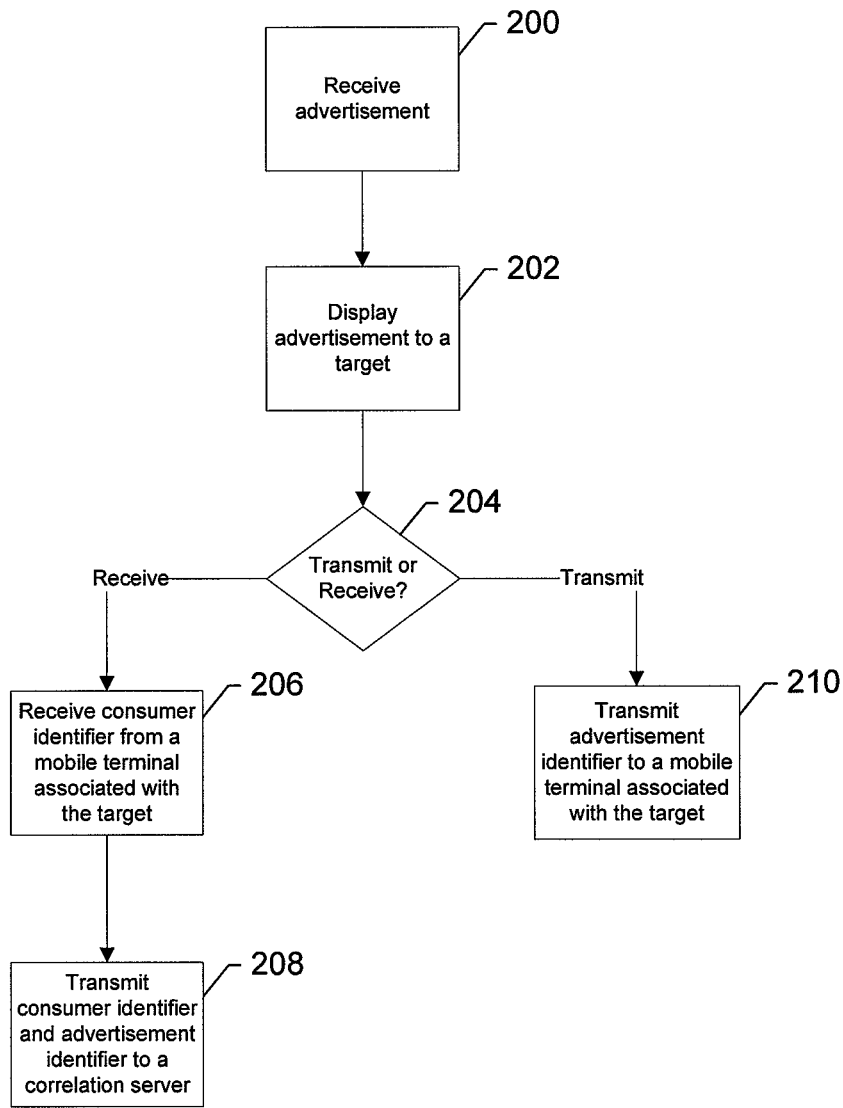
FIG. 6 illustrates a flowchart according to one embodiment for determining the effect of advertising.

In other embodiments, a method for determining the effect of advertising is provided. Referring to FIG. 6, one or more advertisements are received for display to a target. For example, an advertisement for a restaurant may be received at a computer, such as over the Internet. The advertisement may also be displayed to the target over a computer monitor, a television, a mobile terminal screen, a display screen, or a billboard. Continuing the previous example, the advertisement for the restaurant may be a web advertisement that is displayed on a computer monitor. Similarly, the advertisement may be received at a mobile terminal and displayed as a text message or picture message to the target associated with the mobile terminal. See FIG. 6, blocks 200-202.

Depending on the configuration of the advertising apparatus that receives the advertisement, a consumer identifier may be received from a mobile terminal associated with the target. Blocks 204-206. If the consumer identifier is received from the mobile terminal, such as in the embodiment illustrated in FIG. 3, the consumer identifier may then be transmitted to a correlation server along with an advertisement identifier that permits identification of the subject matter of the advertisement. See FIG. 6, block 208. Alternatively, for example according to the embodiment illustrated in FIG. 5, the advertisement identifier may be transmitted to the mobile terminal (e.g., for subsequent transmittal to the correlation server). Block 210. Either way, advertising data may be communicated to the correlation server to be analyzed with shopping data in order to determine indications of the effectiveness of certain advertisements, as previously described.

Figure 7:
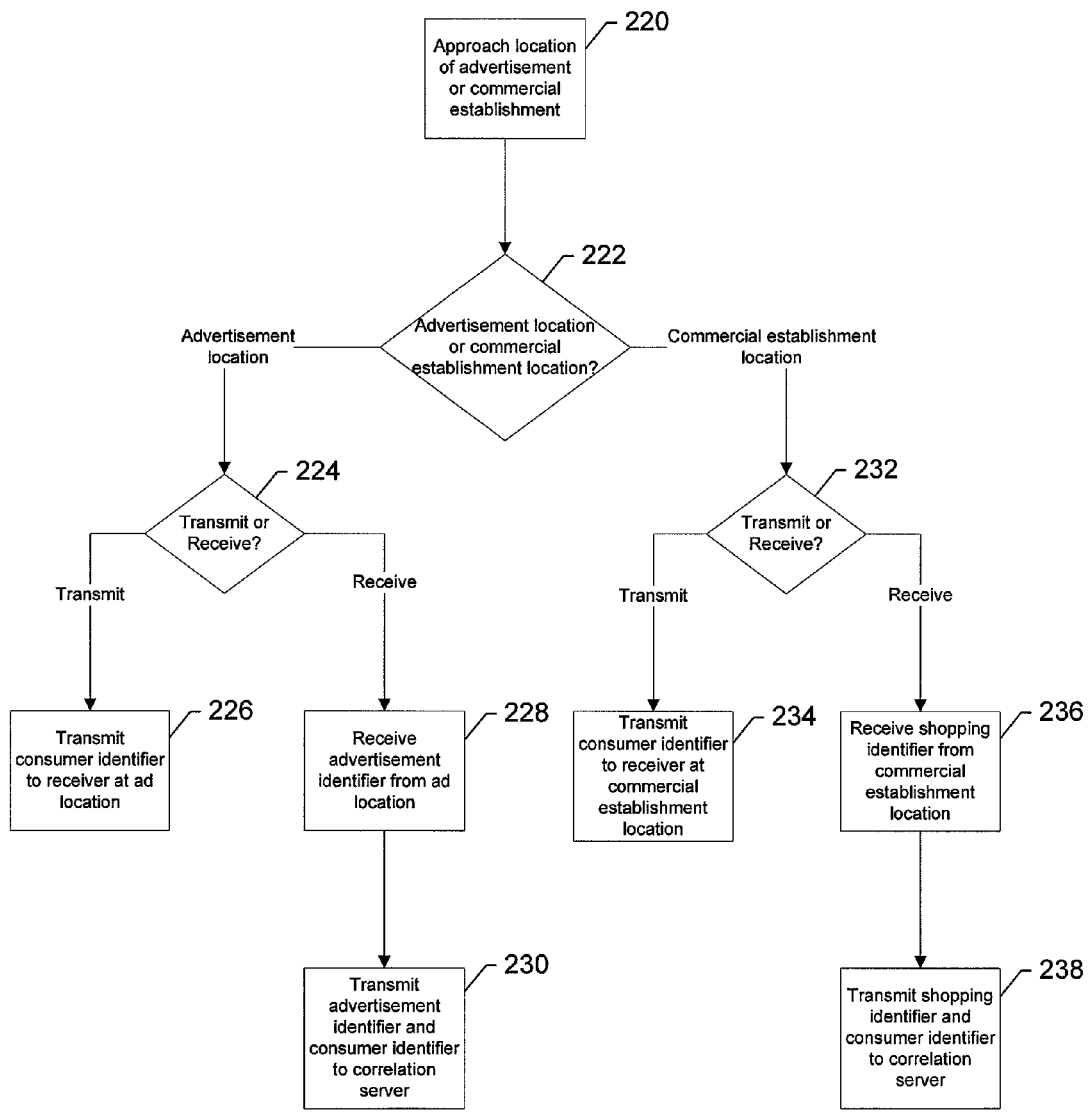
FIG. 7 illustrates a flowchart according to another embodiment for determining the effect of advertising.

In other embodiments, illustrated in FIG. 7, the location of an advertisement or the location of a commercial establishment may be approached, such as by a consumer carrying a mobile terminal. See FIG. 7, block 220. If the advertisement location is approached, the relevant identifier may either by transmitted or received, accordingly, for example depending on the configuration of the mobile terminal and the equipment at the respective location. Blocks 222-224. Thus, for example, if the mobile terminal and advertising apparatus are configured according to the embodiment shown in FIG. 3, a consumer identifier may be transmitted to a receiver at or near the advertisement location (for subsequent transmittal to the correlation server). Block 226. Alternatively, if the mobile terminal and advertising apparatus are configured according to the embodiment shown in FIG. 5, an advertisement identifier may be received from the advertisement location. Block 228. The advertisement identifier and a consumer identifier may then be transmitted to the correlation server, as previously described. Block 230. In this way, the correlation server may receive advertisement data describing the target as well as the subject matter of the advertisement to which the target was exposed.

Similarly, at the location of the commercial establishment, the relevant identifiers may either be transmitted or received, depending, for example, on the configuration of the mobile terminal and/or the equipment at the location of the commercial establishment. See FIG. 7, block 232. Thus, the consumer identifier may be transmitted to a receiver at the location of the commercial establishment, such as an ID receiver at the cash register, POS device, or other device, as shown in FIG. 3, for subsequent transmittal to the correlation server. See FIG. 7, block 234. Alternatively, a shopping identifier may be received (such as by the mobile terminal associated with the shopper) from a transmitter at the commercial establishment location, for example according to the embodiment illustrated in FIG. 5. See FIG. 7, block 236. The shopping identifier may then be transmitted to the correlation server along with a consumer identifier. Block 238. Thus, the correlation server may receive shopping data describing (directly or indirectly) the shopper and the subject matter of the goods or services purchased for analysis in conjunction with the advertisement data.

Figure 8:
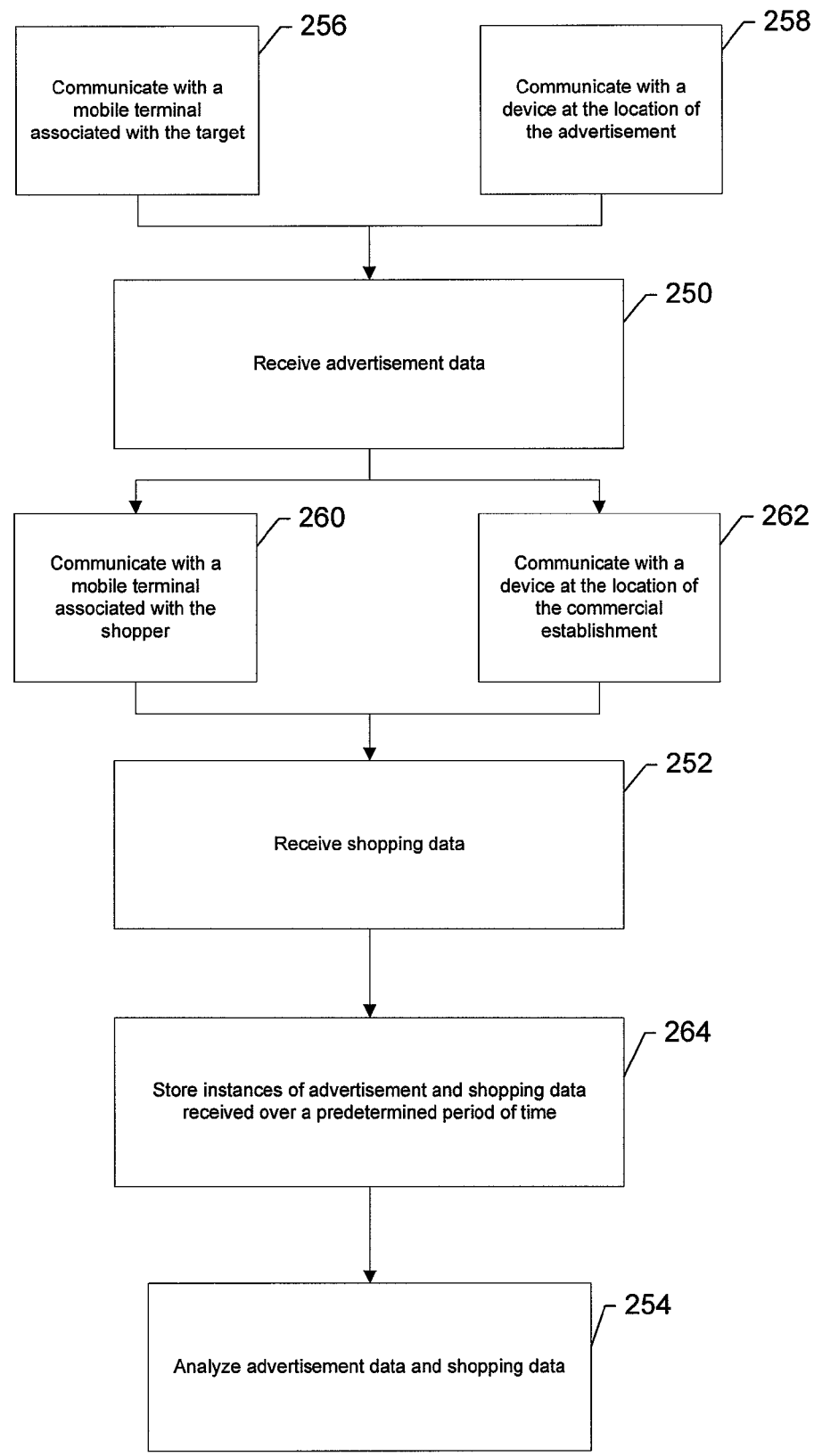
FIG. 8 illustrates a flowchart according to another embodiment for determining the effect of advertising.

In other embodiments, illustrated in FIG. 8, advertisement data including information identifying one or more targets that were proximate a location of one or more advertisements is received. Shopping data including information identifying one or more shoppers that were proximate a location of a commercial establishment is also received. See FIG. 8, blocks 250-252. The advertisement data and the shopping data are then analyzed to determine whether any target associated with an advertisement is also a shopper associated with a commercial establishment relating to the respective advertisement. Block 254. For example, as discussed above, a target who sees an advertisement (for example an advertisement sent to his mobile terminal) may later become a shopper of the subject matter advertised. By correlating advertisement data with shopping data, marketing information, including indicators of the effectiveness of certain advertisements, may be developed.

Depending on the configuration of the mobile terminal and the advertising apparatus involved, communication with a mobile terminal associated with the target may be required to receive the advertisement data. Block 256. As previously discussed, advertisement data may be repeatedly received from the mobile terminal, or advertisement data may be received when the target is proximate the location of the advertisement. Alternatively, communication with a device, such as a transmitter, at the location of the advertisement may be required to obtain the advertisement data. Block 258. For example, a receiver on or near the advertising apparatus may receive a consumer identifier from the mobile terminal associated with the target and a transmitter may subsequently send the consumer identifier as well as an advertisement identifier as part of the advertising data. In some cases, signals associated with the target (e.g., signals transmitted by the target's mobile terminal) may be received and a proximity of the target to the location of the advertisement may be determined based on the signals, for example using GPS, WLAN triangularization, or other location determining techniques.

Likewise, shopping data may be received as a result of communication with the mobile terminal associated with the shopper when the shopper is proximate the location of the commercial establishment or as a result of communication with a device at the location of the commercial establishment. Blocks 260-262. In addition, signals associated with the shopper may be received and a proximity of the shopper to the location of the commercial establishment may be determined based on the signals via location determining techniques. Although the receipt of shopping data is depicted in FIG. 8 as occurring after the receipt of the advertisement data, the advertisement data and the shopping data may be received in any order or they may be received simultaneously or nearly simultaneously. For example, shopping data may be received for one shopper before or at the same time that advertisement data is received for a target who is a different consumer than the shopper.

Furthermore, multiple instances of advertisement data and shopping data for more than one target and/or more than one shopper may be received over a predetermined period of time (such as two weeks). These instances of advertisement and shopping data may be stored, for example in a storage area such as a database, and subsequently accessed to be analyzed against other stored and received data. See block 264. In this way, marketing information, including consumer trends, advertisement effectiveness, and other information, may be compiled.

Exemplary embodiments of the present invention have been described above with reference to block diagrams and flowchart illustrations of methods, apparatuses, systems, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as the controller 20 in FIG. 1, the processor 128 in FIGS. 3 and 5, or the processor 121 in FIG. 4, to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    receiving, by an apparatus via a network from at least one target user device, advertisement data including information identifying a physical location of at least one advertisement, global position system data of the at least one target user device at a first time point, and information identifying the at least one target user device;
    determining, by the apparatus, that the at least one target user device was proximate the physical location of the at least one advertisement at the first time point based on that the global position system data of the at least one target user device was proximate to the physical location of the at least one advertisement, wherein the at least one advertisement describes a commercial establishment and a physical location of the commercial establishment;
    receiving, by the apparatus, shopping data including information identifying the physical location of the commercial establishment and information identifying the at least one visiting user device;
    determining, by the apparatus, that at least one visiting user device was proximate the physical location of the commercial establishment at a subsequent time point based on the information identifying the at least one visiting user device that was pushed via a short range communications channel from the at least one visiting user device to a device located at the physical location of the commercial establishment;
    determining, by the apparatus, based on the information identifying the at least one target user device and the information identifying the at least one visiting user device that the at least one target user device is the at least one visiting user device; and
    determining, by the apparatus based on a correlation time frame between the first time point and the subsequent time point, that the at least one target user device proximate the physical location of the commercial establishment is a result of the at least one advertisement, without using purchase data of the commercial establishment,
    wherein the apparatus is embedded in a server.

2. A method of claim 1, further comprising:
    causing, at least in part, a storage of a plurality of instances of advertisement and shopping data received over a predetermined period of time,
    wherein the physical location of the at least one advertisement is different from the physical location of the commercial establishment.

3. The method of claim 1, wherein the short range communications channel involves either radio frequency, Bluetooth, or infrared.

4. The method of claim 1, further comprising:
    repeatedly receiving the advertisement data associated with the at least one target user device and repeatedly receiving the shopping data associated with the at least one visiting user device; and
    repeatedly determining based, at least in part, on the information identifying the at least one target user device and the information identifying the at least one visiting user device whether the at least one target user device is the at least one visiting user device.

5. An apparatus comprising:
    at least one processor; and
    at least one memory including computer program code for one or more programs,
    the at least one memory and the computer program code configured to, with the at least one processor, cause the apparatus located at a physical location of at least one advertisement to perform at least the following,
    receive the at least one advertisement, wherein the at least one advertisement describes a commercial establishment and a physical location of the commercial establishment;
    render to a target user device via a short range communications channel between the target user device and the apparatus, a presentation of the at least one advertisement within a perceivable range of at least one user of the target user device that is proximate the physical location;
    receive a device identifier identifying the target user device and global position system data of the target user device pushed via the short range communications channel at a first time point; and
    transmit, to a server, an advertisement identifier of the at least one advertisement, the device identifier identifying the target user device, and the global position system data of the target user device,
    wherein the target user device is determined as proximate the physical location of the at least one advertisement at the first time point based on the global position system data of the target user device,
    wherein the device identifier is compared to another identifier identifying a visiting user device proximate the physical location of the commercial establishment at a subsequent time point to determine that the target user device is the visiting user device, the another identifier is pushed via a short range communications channel from the visiting user device to a second device located at the physical location of the commercial establishment, and wherein the target user device proximate the physical location of the commercial establishment is determined as a result of the at least one advertisement based on a correlation time frame between the first time point and the subsequent time point, without using purchase data of the commercial establishment.

6. An apparatus of claim 5, wherein the presentation of the at least one advertisement to the target is rendered via a computer monitor, a television, a mobile terminal screen, a display screen, a billboard, or a combination thereof, wherein the physical location of the at least one advertisement is different from the physical location of the commercial establishment.

7. An apparatus comprising:

at least one processor; and at least one memory including computer program code for one or more programs, the at least one memory and the computer program code configured to, with the at least one processor, cause the apparatus embedded in a target user device to perform at least the following, receive advertisement data including at least one advertisement and information identifying a physical location of the at least one advertisement;

initiate a presentation of the at least one advertisement on a display of a target user device;

determine that the target user device was proximate to the physical location of the at least one advertisement at a first time point based on that global position system data of the target user device at the first time point was proximate to the physical location of the at least one advertisement, wherein the at least one advertisement describes a commercial establishment and a physical location of the commercial establishment;

receive shopping data including information identifying a physical location of a commercial establishment visited at a subsequent time point pushed via a short range communications channel from a device located at the physical location of the commercial establishment visited at the subsequent time point;

determine based on the information identifying the commercial establishment described in the at least one advertisement and the information identifying the commercial establishment visited at the subsequent time point that the commercial establishment described in the at least one advertisement is the commercial establishment visited at the subsequent time point;

determine, based on a correlation time frame between the first time point and the subsequent time point, that the target user device proximate the physical location of the commercial establishment at the subsequent time point is a result of the at least one advertisement, without using purchase data of the commercial establishment; and initiate a transmission of the advertisement data and the shopping data to a server when determining that the target user device proximate the physical location of the commercial establishment at the subsequent time point is a result of the at least one advertisement.

8. An apparatus comprising:

at least one processor; and at least one memory including computer program code for one or more programs, the at least one memory and the computer program code configured to, with the at least one processor, cause the apparatus to perform at least the following, receive, via a network from at least one target user device, advertisement data including information identifying a physical location of at least one advertisement, global position system data of the at least one target user device at a first time point, and information identifying the at least one target user device;

determine that the at least one target user device was proximate the physical location of the at least one advertisement at the first time point based on that the global position system data of the at least one target user device was proximate to the physical location of the at least one advertisement, wherein the at least one advertisement describes a commercial establishment and a physical location of the commercial establishment;

receive shopping data including information identifying the physical location of the commercial establishment and information identifying the at least one visiting user device;

determine that at least one visiting user device was proximate the physical location of the commercial establishment at a subsequent time point based on the information identifying the at least one visiting user device that was pushed via a short range communications channel from the at least one visiting user device to a device located at the physical location of the commercial establishment;

determine based on the information identifying the at least one target user device and the information identifying the at least one visiting user device that the at least one target user device is the at least one visiting user device; and determine, based on a correlation time frame between the first time point and the subsequent time point, that the at least one target user device proximate the physical location of the commercial establishment is a result of the at least one advertisement, without using purchase data of the commercial establishment, wherein the apparatus is embedded in a server.

9. The apparatus of claim 8, wherein the apparatus is further caused to:

repeatedly receive the advertisement data associated with the at least one target user device and repeatedly receive the shopping data associated with the at least one visiting user device; and repeatedly determining based on the advertisement data and the shopping data whether the at least one target user device is the at least one visiting user device, wherein the physical location of the at least one advertisement is different from the physical location of the commercial establishment.

10. An apparatus of claim 8, wherein the advertisement data is received from the target user device when the target user device is proximate the physical location of the at least one advertisement, and the shopping data is received from the at least one visiting user device when the at least one visiting user device is proximate the physical location of the commercial establishment.

11. An apparatus of claim 10, wherein the apparatus is further caused to:
    receive the advertisement data and the shopping data from the at least one target user device when the shopping data relates to a subject matter of the advertisement data.

12. An apparatus of claim 8, wherein the apparatus is further caused to:
    cause, at least in part, a storage of multiple instances of advertisement data and shopping data for a plurality of target user devices and visiting user devices.

13. A non-transitory computer-readable storage medium carrying one or more sequences of one or more instructions which, when executed by one or more processors, cause an apparatus to at least perform the following steps:
    receiving, via a network from at least one target user device, advertisement data including information identifying a physical location of at least one advertisement, global position system data of the at least one target user device at a first time point, and information identifying the at least one target user device;
    determining that the at least one target user device was proximate the physical location of the at least one advertisement at the first time point based on that the global position system data of the at least one target user device was proximate to the physical location of the at least one advertisement, wherein the at least one advertisement describes a commercial establishment and a physical location of the commercial establishment;
    receiving shopping data including information identifying the physical location of the commercial establishment and information identifying the at least one visiting user device;
    determining that at least one visiting user device was proximate the physical location of the commercial establishment at a subsequent time point based on the information identifying the at least one visiting user device that was pushed via a short range communications channel from the at least one visiting user device to a device located at the physical location of the commercial establishment;
    determining based on the information identifying the at least one target user device and the information identifying the at least one visiting user device that the at least one target user device is the at least one visiting user device; and
    determining, based on a correlation time frame between the first time point and the subsequent time point, that the at least one target user device proximate the physical location of the commercial establishment is a result of the at least one advertisement, without using purchase data of the commercial establishment,
    wherein the apparatus is embedded in a server.

14. A non-transitory computer-readable storage medium according to claim 13, wherein the apparatus is caused to further perform:
    causing, at least in part, storage of multiple instances of advertisement data and shopping data for a plurality of target user devices and visiting user devices,
    wherein the physical location of the at least one advertisement is different from the physical location of the commercial establishment.

15. A method comprising:
    receiving, at an apparatus located at a physical location, at least one advertisement, wherein the at least one advertisement describes a commercial establishment and a physical location of the commercial establishment;
    rendering, to a target user device by the apparatus via a short range communications channel between the target user device and the apparatus, a presentation of the at least one advertisement within a perceivable range of at least one user of the target user device that is proximate the physical location;
    receiving, by the apparatus, a device identifier identifying the target user device and global position system data of the target user device pushed via the short range communications channel at a first time point; and
    transmitting, by the apparatus to a server, an advertisement identifier of the at least one advertisement, the device identifier identifying the target user device, and the global position system data of the target user device,
    wherein the target user device is determined as proximate the physical location of the at least one advertisement at the first time point based on the global position system data of the target user device,
    wherein the device identifier is compared to another identifier identifying a visiting user device proximate the physical location of the commercial establishment at a subsequent time point to determine that the target user device is the visiting user device, the another identifier is pushed via a short range communications channel from the visiting user device to a second device located at the physical location of the commercial establishment, and
    wherein the target user device proximate the physical location of the commercial establishment is determined as a result of the at least one advertisement based on a correlation time frame between the first time point and the subsequent time point, without using purchase data of the commercial establishment.

16. A method of claim 15, wherein the presentation of the at least one advertisement is rendered via a computer monitor, a television, a mobile terminal screen, a display screen, a billboard, or a combination thereof,
    wherein the physical location of the at least one advertisement is different from the physical location of the commercial establishment.

17. A method comprising:
    receiving, by an apparatus, advertisement data including at least one advertisement and information identifying a physical location of the at least one advertisement;
    initiating, by the apparatus, a presentation of the at least one advertisement on a display of a target user device;
    determining, by the apparatus, that the target user device was proximate to the physical location of the at least one advertisement at a first time point based on that global position system data of the target user device at the first time point was proximate to the physical location of the at least one advertisement, wherein the at least one advertisement describes a commercial establishment and a physical location of the commercial establishment;
    receiving, by the apparatus, shopping data including information identifying a physical location of a commercial establishment visited at a subsequent time point pushed via a short range communications channel from a device located at the physical location of the commercial establishment visited at the subsequent time point;

determining, by the apparatus, based on the information identifying the commercial establishment described in the at least one advertisement and the information identifying the commercial establishment visited at the subsequent time point that the commercial establishment described in the at least one advertisement is the commercial establishment visited at the subsequent time point;

determining, by the apparatus based on a correlation time frame between the first time point and the subsequent time point, that the target user device proximate the physical location of the commercial establishment at the subsequent time point is a result of the at least one advertisement, without using purchase data of the commercial establishment and initiating, by the apparatus, a transmission of the advertisement data and the shopping data to a server when determining that the target user device proximate the physical location of the commercial establishment at the subsequent time point is a result of the at least one advertisement, wherein the apparatus is embedded in the target user device.

* * * * *